(12) United States Patent
Barnes et al.

(10) Patent No.: US 8,675,825 B1
(45) Date of Patent: *Mar. 18, 2014

(54) SYSTEMS AND METHODS FOR SECURE RECORDING IN A CUSTOMER CENTER ENVIRONMENT

(75) Inventors: Robert John Barnes, Watford Herts (GB); Marc Calahan, Woodstock, GA (US); Jamie Richard Williams, Fleet (GB); Thomas Z. Dong, Marietta, GA (US); Damian Smith, Epsom (GB)

(73) Assignee: Verint Americas Inc., Alpharetta, GA (US)

( * ) Notice: Subject to any disclaimer, the term of this patent is extended or adjusted under 35 U.S.C. 154(b) by 210 days.

This patent is subject to a terminal disclaimer.

(21) Appl. No.: 12/968,240

(22) Filed: Dec. 14, 2010

Related U.S. Application Data

(63) Continuation of application No. 12/470,768, filed on May 22, 2009.

(60) Provisional application No. 61/055,590, filed on May 23, 2008.

(51) Int. Cl.
*H04M 1/64* (2006.01)

(52) U.S. Cl.
USPC .......................................... 379/68; 380/257

(58) Field of Classification Search
USPC ................ 379/67.1, 68, 88.08, 88.16, 88.22, 379/88.23, 88.24, 88.25; 380/257
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |

(Continued)

FOREIGN PATENT DOCUMENTS

| | | | |
|---|---|---|---|
| EP | 0453128 A2 | 10/1991 | |
| EP | 0773687 A2 | 5/1997 | |

(Continued)

OTHER PUBLICATIONS

Kane, AOL-Tivo: You've Got Interactive TV, ZDNN, Aug. 17, 1999.
Kay, "E-Mail in Your Kitchen", PC World Online, Mar. 28, 1996.
Kenny, "TV Meets Internet", PC World Online, Mar. 28, 1996.
Linderholm, "Avatar Debuts Home Theater PC", PC World Online, Dec. 1, 1999.
Needle, "Will the Net Kill Network TV?" PC World Online, Mar. 10, 1999.

(Continued)

*Primary Examiner* — Olisa Anwah
(74) *Attorney, Agent, or Firm* — Meunier Carlin & Curfman

(57) ABSTRACT

Systems and methods for secure recording in a customer center environment are provided. The system receives data related to a communication at a media distribution device. A key is provided by a key server to the media distribution device to encrypt the received data. In addition, an identifier may be associated with the received data. The key and the identifier are stored in a database associated with the key server. The encrypted data is recorded the a recorder, where it is accessible to authorized users within the customer center. Upon request, the key is provided to the authorized user to decrypt the encrypted data for play back. The customer center environment may include a user interface for viewing customer contacts. The contact may be organized into folders and annotations associated with the customer contacts may be received.

18 Claims, 8 Drawing Sheets

(56) References Cited

U.S. PATENT DOCUMENTS

| | | |
|---|---|---|
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,946,375 A | 8/1999 | Pattison et al. |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,249,570 B1 | 6/2001 | Glowny et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,529,602 B1 * | 3/2003 | Walker et al. ............... 380/283 |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,625,734 B1 | 9/2003 | Marvit et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,782,412 B2 | 8/2004 | Brophy et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,042,987 B2 * | 5/2006 | Schwartz et al. ............... 379/68 |
| 7,848,510 B2 * | 12/2010 | Shaffer et al. ............ 379/266.01 |
| 7,881,471 B2 * | 2/2011 | Spohrer et al. ............... 380/257 |
| 8,249,244 B2 * | 8/2012 | Naparstek et al. ........ 379/265.05 |
| 2001/0000962 A1 | 5/2001 | Rajan |
| 2001/0032335 A1 | 10/2001 | Jones |
| 2001/0042048 A1 | 11/2001 | Boykin et al. |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0064283 A1 | 5/2002 | Parenty |
| 2002/0065911 A1 | 5/2002 | von Klopp et al. |
| 2002/0065912 A1 | 5/2002 | Catchpole et al. |
| 2002/0075880 A1 | 6/2002 | Dolinar et al. |

(56) References Cited

U.S. PATENT DOCUMENTS

| | | | |
|---|---|---|---|
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2002/0184537 | A1 | 12/2002 | Inokuchi et al. |
| 2003/0028765 | A1 | 2/2003 | Cromer et al. |
| 2003/0055883 | A1 | 3/2003 | Wiles et al. |
| 2003/0065941 | A1 | 4/2003 | Ballard et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2003/0204736 | A1 | 10/2003 | Garrison et al. |
| 2004/0100507 | A1 | 5/2004 | Hayner et al. |
| 2004/0165717 | A1 | 8/2004 | McIlwaine et al. |
| 2004/0207724 | A1 | 10/2004 | Crouch et al. |
| 2005/0050345 | A1 | 3/2005 | Dowdy et al. |
| 2006/0087555 | A1 | 4/2006 | Boyd et al. |
| 2006/0146805 | A1* | 7/2006 | Krewson .................. 370/352 |
| 2006/0149399 | A1 | 7/2006 | Norhammar et al. |
| 2007/0036283 | A1 | 2/2007 | Shaffer et al. |
| 2008/0037719 | A1* | 2/2008 | Doren ........................ 379/85 |
| 2008/0080685 | A1* | 4/2008 | Barnes et al. ........ 379/112.05 |
| 2009/0016522 | A1 | 1/2009 | Torres et al. |

FOREIGN PATENT DOCUMENTS

| | | |
|---|---|---|
| EP | 0989720 | 3/2000 |
| GB | 2369263 | 5/2002 |
| WO | WO98/43380 | 11/1998 |
| WO | WO00/16207 | 3/2000 |

OTHER PUBLICATIONS

Press, Two Cultures, The Internet and Interactive TV, Universite de Montreal.
Reuters, "Will TV Take Over Your PC?", PC World Online.
Rohde, "Gates Touts Interactive TV", InfoWorld, Oct. 14, 1999.
Ross, "Broadcasters Use TV Signals to Send Data", PC World, Oct. 1996.
Schlisserman, "Is Web TV a Lethal Weapon?", PC World Online.
Stewart, "Interactive Television at Home: Television Meets the Internet", Aug. 1998.
Swedlow, "Computer TV Shows: Ready for Prime Time?", PC World Online.
Wilson, "U.S. West Revisits Interactive TV", Interactive Week, Nov. 28, 1999.
Klein, "Command Decision Training Support Technology," Web page, unverified print date of Apr. 12, 2002.
Notification of Transmittal of the International Search Report and the Written Opinion of the International Searching Authority, dated Sep. 24, 2008.
Notification Concerning Transmittal of International Preliminary Report on Patentability and Written Opinion of the International Searching Authority, dated Apr. 9, 2009.
Minton-Eversole, "IBT Training Truths Behind the Hype," Technical Skills and Training pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" American Association for Artificial Intelligence, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Nelson et al., "The Assessment of End-User Training Needs," Communications ACM 38(7):27-39 (Jul. 1995).
O'Herron, "CenterForce Technologies' CenterForce Analyzer," Web page, unverified print date of Mar. 20, 2002, unverified cover date of Jun. 1, 1999.
O'Roark, "Basic Skills Get a Boost," Technical Training pp. 10-13 (Jul./Aug. 1998).
Pamphlet, "On Evaluating Educational Innovations," authored by Alan Lesgold, unverified cover date of Mar. 5, 1998.
Papa et al., "A Differential Diagnostic Skills Assessment and Tutorial Tool," Computer Education 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark Web product," Web page, unverified print date of Apr. 1, 2002.
Phaup, "QM Perception Links with Integrity Training's WBT Manager to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.
Piskurich, "Now-You-See-'Em, Now-You-Don't Learning Centers," Technical Training pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," Technical Skills and Training pp. 6-8 (May/Jun. 1995).
Stormes, "Case Study: Restructuring Technical Training Using ISD," Technical Skills and Training pp. 23-26 (Feb./ Mar. 1997).
Tennyson, "Artificial Intelligence Methods in Computer-Based Instructional Design," Journal of Instruction Development 7(3):17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," ACM pp. 194-198 (1997).
Uiterwijk et al., "The virtual classroom," InfoWorld 20(47):6467 (Nov. 23, 1998).
Unknown Author, "Long-distance learning," InfoWorld 20(36):7276 (1998).
Untitled, 10th Mediterranean Electrotechnical Conference vol. 1 pp. 124-126 (2000).
Watson and Belland, "Use of Learner Data in Selecting Instructional Content for Continuing Education," Journal of Instructional Development 8(4):29-33 (1985).
Weinschenk, "Performance Specifications as Change Agents," Technical Training pp. 12-15 (Oct. 1997).
Witness Systems promotional brochure for eQuality entitled "Bringing eQuality to eBusiness.".
Aspect Call Center Product Specification, "Release 2.0", Aspect Telecommunications Corporation, May 23, 1998, 798.
Metheus X Window Record and Playback, XRP Features and Benefits, 2 pages, Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, "Everything You Ever Wanted to Know About Cryptography Legislation . . . (But Were too Sensible to Ask)", PC World Online, Dec. 14, 1999.
Berst, "It's Baa-aack. How Interactive TV is Sneaking Into Your Living Room", The AnchorDesk, May 10, 1999.
Berst, "Why Interactive TV Won't Turn You On (Yet)", The AnchorDesk, Jul. 13, 1999.
Borland and Davis, "US West Plans Web Services on TV", CNETNews.com, Nov. 22, 1999.
Brown, "Let PC Technology Be Your TV Guide", PC Magazine, Jun. 7, 1999.
Brown, "Interactive TV: The Sequel", NewMedia, Feb. 10, 1998.
Cline, "Deja vu—Will Interactive TV Make It This Time Around?", DevHead, Jul. 9, 1999.
Crouch, "TV Channels on the Web", PC World, Sep. 15, 1999.

(56) References Cited

OTHER PUBLICATIONS

D'Amico, "Interactive TV Gets $99 set-top box", IDG.net, Oct. 6, 1999.
Davis, "Satellite Systems Gear Up for Interactive TV Fight", CNETNews.com, Sep. 30, 1999.
Diederich, "Web TV Data Gathering Raises Privacy Concerns", ComputerWorld, Oct. 13, 1998.
"Hong Kong Comes First with Interactive TV", SCI-TECH, Dec. 4, 1997.
EchoStar, "MediaX Mix Interactive Multimedia With Interactive Television", PRNews Wire, Jan. 11, 1999.
Furger, "The Internet Meets the Couch Potato", PCWorld, Oct. 1996.
Office Action, dated Dec. 22, 2010, received from the United States Patent and Trademark Office in connection with U.S. Appl. No. 12/466,673, filed May 15, 2009.
"Customer Spotlight: Navistar International," Web page, unverified print date of Apr. 1, 2002.
DKSystems Integrates QM Perception with OnTrack for Training, Web page, unverified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"Price Waterhouse Coopers Case Study: The Business Challenge," Web page, unverified cover date of 2000.
Abstract, networking: "An Online Webliography," Technical Training pp. 4-5 (Nov./Dec. 1998).
Adams et al., "Our Turn-of-the-Century Trend Watch" Technical Training, pp. 46-47 (Nov./Dec. 1998).
Barron, "The Road to Performance: Three Vignettes," Technical Skills and Training, pp. 12-14 (Jan. 1997).
Bauer, "Technology Tools: Just-in-Time Desktop Training is Quick, Easy, and Affordable," Technical Training, pp. 8-11 (May/Jun. 1998).
Beck et al., "Applications of AI in Education," AMC Crossroads vol. 1:1-13 (Fall 1996), Web page, unverified print date of Apr. 12, 2002.
Benson and Cheney, "Best Practices in Training Delivery," Technical Training pp. 14-17 (Oct. 1996).
Bental and Cawsey, "Personalized and Adaptive Systems for Medical Consumer Applications," Communications ACM 45(5):62-63 (May 2002).
Witness Systems promotional brochure for eQuality entitled "Building Customer Loyalty Through Business-Driven Recording of Multimedia Interactions in your Contact Center" (2000).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilovsky et al., "Distributed intelligent tutoring on the Web," Proceedings of the 8th World Conference of the AIED Society, Kobe, Japan, Aug. 18-22 pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date Apr. 12, 2002, unverified cover date of 1995.
Calvi and De Bra, "Improving the Usability of Hypertext Courseware through Adaptive Linking," ACM, unknown page numbers (1997).
Coffey, "Are Performance Objectives Really Necessary?" Technical Skills and Training pp. 25-27 (Oct. 1995).
Cohen, "Knowledge Management's Killer App," pp. 1-11, Web page, unverified print date of Apr. 12, 2002, unverified cover date of 2001.
Cole-Gomolski, "New ways to manage E-Classes," Computerworld 32(48):4344 (Nov. 30, 1998).
Cross, "Sun Microsystems—the SunTAN Story," Internet Time Group 8 (2001).
Cybulski and Linden, "Teaching Systems Analysis and Design Using Multimedia and Patterns," unknown date, unknown source.
De Bra et al., "Adaptive Hypermedia: From Systems to Framework," ACM (2000).
De Bra, "Adaptive Educational Hypermedia on the Web," Communications ACM 45(5):60-61 (May 2002).
Dennis and Gruner, "Computer Managed Instruction at Arthur Andersen & Company: A Status Report," Educational Technical, pp. 7-16 (Mar. 1992).
Diessel et al., "Individualized Course Generation: A Marriage Between CAL and ICAL," Computers Educational 22(1/2) 57-64 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," Personal Learning Network pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
e-Learning the future of learning, THINQ Limited, London, Version 1.0 (2000).
Eline, "A Trainer's Guide to Skill Building," Technical Training pp. 34-41 (Sep./Oct. 1998).
Eline, "Case Study: Bridging the Gap in Canada's IT Skills," Technical Skills and Training pp. 23-25 (Jul. 1997).
Eline, "Case Study: IBT's Place in the Sun," Technical Training pp. 12-17 (Aug./Sep. 1997).
Fritz, "CB templates for productivity: Authoring system templates for trainers," Emedia Professional 10(8):6876 (Aug. 1997).
Fritz, "ToolBook II: Asymetrix's updated authoring software tackles the Web," Emedia Professional 10(2):102106 (Feb. 1997).
Gibson et al., "A Comparative Analysis of Web-Based Testing and Evaluation Systems," pp. 1-8, Web page, unverified print date of Apr. 11, 2002.
Hallberg and DeFiore, "Curving Toward Performance: Following a Hierarchy of Steps Toward a Performance Orientation," Technical Skills and Training pp. 9-11 (Jan. 1997).
Harsha, "Online Training 'Sprints' Ahead," Technical Training pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," Technical Skills and Training pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Koonce, "Where Technology and Training Meet," Technical Training pp. 10-15 (Nov./Dec. 1998).
Kursh, "Going the distance with Web-based training," Training and Development 52(3):5053 (Mar. 1998).
Larson, "Enhancing Performance Through Customized Online Learning Support," Technical Skills and Training pp. 25-27 (May/Jun. 1997).
Linton et al., "OWL: A Recommender System for Organization-Wide Learning," Educational Technical Society 3 (1):62-76 (2000).
Lucadamo and Cheney, "Best Practices in Technical Training," Technical Training pp. 21-26 (Oct. 1997).
McNamara, "Monitoring Solutions: Quality Must Be Seen and Heard," Inbound/Outbound pp. 66-67 (Dec. 1989).
Merrill, "The New Component Design Theory: Instruction design for courseware authoring," Instructional Science 16:19-34 (1987).
U.S. Official Action, dated Aug. 6, 2012, received in connection with related U.S. Appl. No. 12/470,768.

\* cited by examiner

SYSTEMS AND METHODS FOR SECURE RECORDING IN A CUSTOMER CENTER ENVIRONMENT

CROSS-REFERENCE TO RELATED APPLICATION

The present is a continuation of U.S. patent application Ser. No. 12/470,768, filed on May 22, 2009, and entitled "Systems and Methods for Recording Solutions," the disclosure of which is incorporated herein by reference in its entirety. The present application also claims priority to U.S. Provisional Patent Application No. 61/055,590, filed on May 23, 2008, and entitled "Systems and Methods for Recording Solutions," the disclosure of which is incorporated herein by reference in its entirety.

BACKGROUND

In many network configurations, there exists a desire to capture data from one or more computing devices within that network. More specifically, many network configurations can include Voice over Internet Protocol (VoIP) communications. In such a configuration, users may communicate via a VoIP telephone, a soft phone, and/or other communications devices. Additionally, these parties may also desire the ability to record communication and other data presented to a user of a communications and/or computing device for compliance and training purposes.

Customer centers may wish to comply with the Payment Card Industry Data Security Standard (PCI DSS), which is a set of requirements designed to ensure that companies that process, store or transmit credit card information maintain a secure environment. In distributed networks for recording, compliance may be difficult, as recording data in such networks may traverse many communications links inside and outside a customer center. In addition, many existing IP recording solutions can require a recording device to be located at each location to tap into the data at that location. Where the number of locations is large, this becomes very expensive. Where the total number of calls to be recorded is low, such a network configuration can become uneconomical, as the costs of the hardware and related support are spread across only a few recordings per day.

With regard to training, many customer centers deploy recorders for quality monitoring purposes and compliance purposes. Communications between callers and agents are recorded, monitored and sampled. However, current solutions lack configuration flexibility and intuitiveness that would benefit training programs.

SUMMARY

Systems and methods for secure recording in a customer center environment are provided. The system receives data related to a communication at a media distribution device. A key is provided by a key server to the media distribution device to encrypt the received data. In addition, an identifier may be associated with the received data. The key and the identifier are stored in a database associated with the key server. The encrypted data is recorded the recorder, where it is accessible to authorized users within the customer center. Upon request, the key is provided to the authorized user to decrypt the encrypted data for play back. In some implementations, the data remains encrypted on the recorder and the data may be exported for viewing on a computing device having a media player application.

In some implementations, systems and methods are provided for viewing customer contacts received in a customer center. Included may be communicating with a telephony component in a communications network associated with a recording system in the customer center and recording received customer communications data in the recording system. A user interface may be provided in which the customer communications data is presented and organized into folders representative of the customer contacts. Annotations associated with the customer contacts may be received.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included in this disclosure are implementations of integrated workforce optimization platforms. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Exemplary systems are first discussed with reference to the figures. Although these systems are described in detail, they are provided for purposes of illustration only and various modifications are feasible. After the exemplary systems are described, examples of flow diagrams and sequence diagrams of the systems are provided to explain the manner in which communications data can be recorded.

Figure 1:
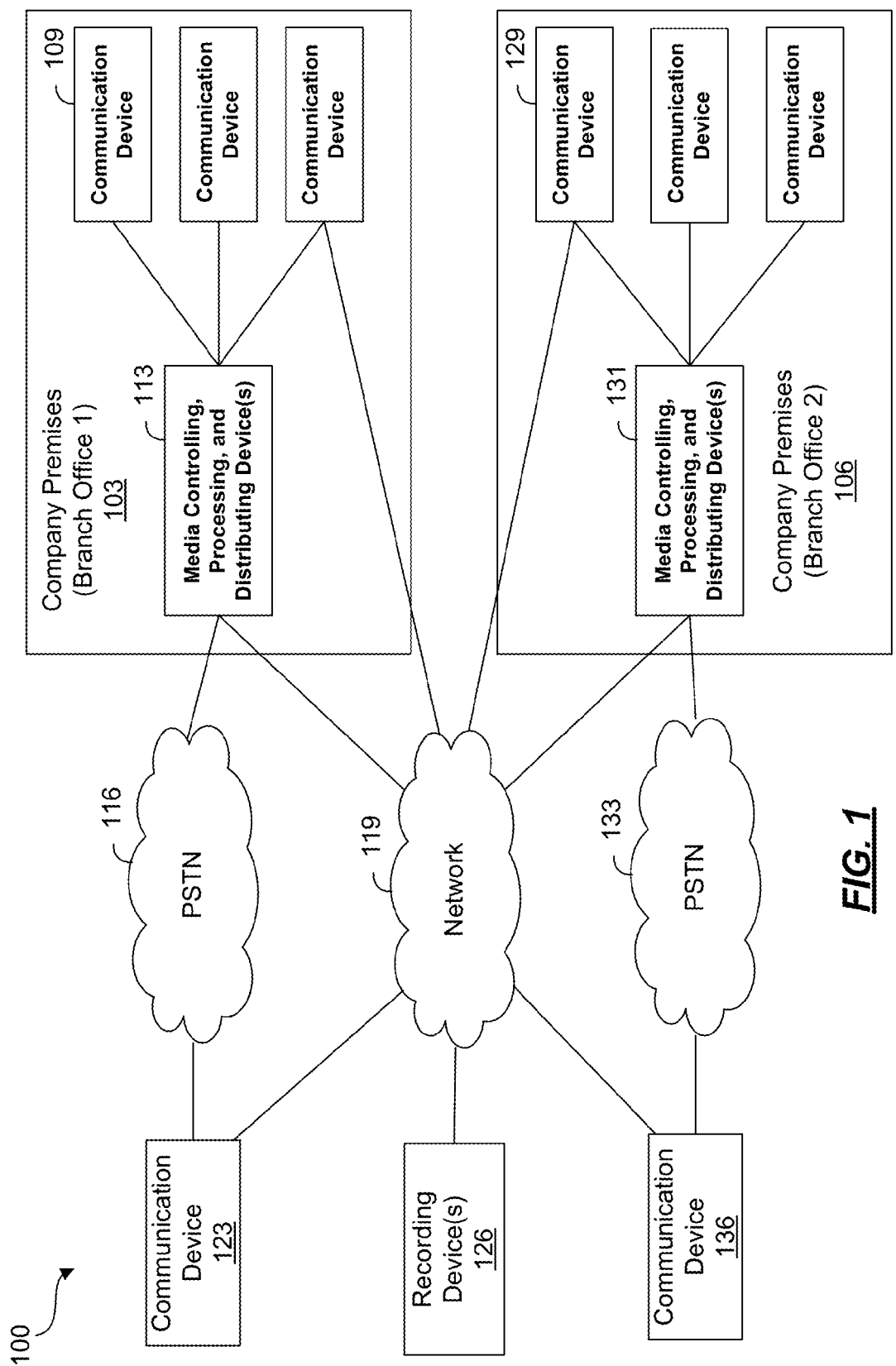
FIG. 1 is a schematic diagram of an embodiment of a system in which communication can be recorded by a recorder located on an associated network.

Referring now in more detail to the figures, FIG. 1 is a schematic diagram of an embodiment of a system in which communication at a company, e.g., a customer center, can be recorded by a recorder located on a network 119, such as an Internet Protocol (IP) Network, connected to the company. As used herein, a customer center includes, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

The embodiments of systems and methods of recording media communication via a recorder are discussed in U.S. application Ser. No. 11/394,496, filed on Mar. 31, 2006, entitled "Duplicate Media Stream," which is hereby incorporated by reference in its entirety, U.S. application Ser. No. 11/394,410, filed on Mar. 31, 2006, entitled "Systems and Methods for endpoint recording using phones," which is hereby incorporated by reference in its entirety, U.S. application Ser. No. 11/395,350, filed on Mar. 31, 2006, entitled "Systems and Methods for endpoint recording using a conference bridge," which is hereby incorporated by reference in its entirety, U.S. application Ser. No. 11/395,759, filed on Mar. 31, 2006, entitled "Systems and Methods for endpoint recording using a media application server," which is hereby incorporated by reference in its entirety, U.S. application Ser. No. 11/529,947, filed on Sep. 29, 2006, entitled "Systems and Methods for endpoint recording using gateways," which is hereby incorporated by reference in its entirety, and U.S. application Ser. No. 11/540,902, filed on Sep. 29, 2006, entitled "Systems and Methods for endpoint recording using recorders," which is hereby incorporated by reference in its entirety.

Referring back to FIG. 1, two branch offices 103, 106 are depicted that may need to record communication between employees and between employees and customers. Customer communication devices 123, 136 connect to branch offices 103, 106 either via the network 119 or via a Public Switched Telephony Network (PSTN) 116, 133, or both, respectively. The customer communication devices 123, 136 can include, but are not limited to, telephones, soft-phones on hand held devices, or Personal Computers.

Recording device(s) 126 can be deployed on the network 119 connected to the branch offices 103, 106. Alternatively or additionally, the recording devices 126 can communicate with media controlling/processing/distributing devices 113, 131 in a secure encrypted environment, for getting communication events and for sending instructions. For example, the recording devices 126 can communicate with telephony components at the company premises 103, 106 to distribute recording-related transcoding for desired recording performances or based on a business policy. One advantage, among others, is that the recording devices 126 can reduce their processing load by having a telephony component, such as a handset, store-forward device, soft switch, gateway, conference bridge, and/or media application server, to adjust the packet size and/or change the codec of a communication data before the recording devices 126 receive the communication data. The modified communication data can increase the performance of the recording devices 126 by reducing the processing load of the recording devices 126.

Embodiments of a store-forward device are discussed in U.S. application Ser. No. 11/394,408, filed on Mar. 31, 2006, entitled "Distributed Voice Over Internet Protocol Recording," which is hereby incorporated by reference in its entirety. In operation, embodiments of the store-forward device can include, but not limited to, communication devices 109, 129 and media controlling/processing/distributing devices 113, 131. Screen capture of various data related to a communication can be implemented such that an application server can contact the capture daemon and obtain screen frames associated with a communication. Similarly, for voice capture, many communications devices, such as IP telephones, generally include a small switching hub and can be wired in between a local network infrastructure and the media controlling/processing/distributing devices 113, 131 proximate to the communications devices 109, 129.

With the capability of the recording devices 126 to communicate with the media controlling/processing/distributing devices 113, 131, the recording device 126 can request to modify data associated with communications at the customer center before receiving and recording the communications data. Alternatively or additionally, if a recording device is a cluster of recording devices, the recording device can communicate with the media controlling/processing/distributing devices 113, 131 to select which recording device from the cluster of recording devices to record the communications for load balancing purposes.

The media controlling/processing devices control the communication between customers and employees and between employees. The media controlling/processing devices can include, but are not limited to, voice gateways, soft switches, conference bridges, and multi-media application servers. The distributing devices can include, but are not limited to, routers and switches. Based on static configuration or instructions from the recording devices, the media controlling/processing devices can duplicate and transmit on-going communication between communication devices 109, 129, 123, 136 to the recording devices via the network 119 using its media processing features. Alternatively or additionally, the media controlling/processing devices can also instruct a communication device 109, 129 at the company premises 103, 106, respectively, to duplicate and transmit any on-going communications to the recording devices 126 using media processing features on the communication devices 109, 129.

Figure 2:
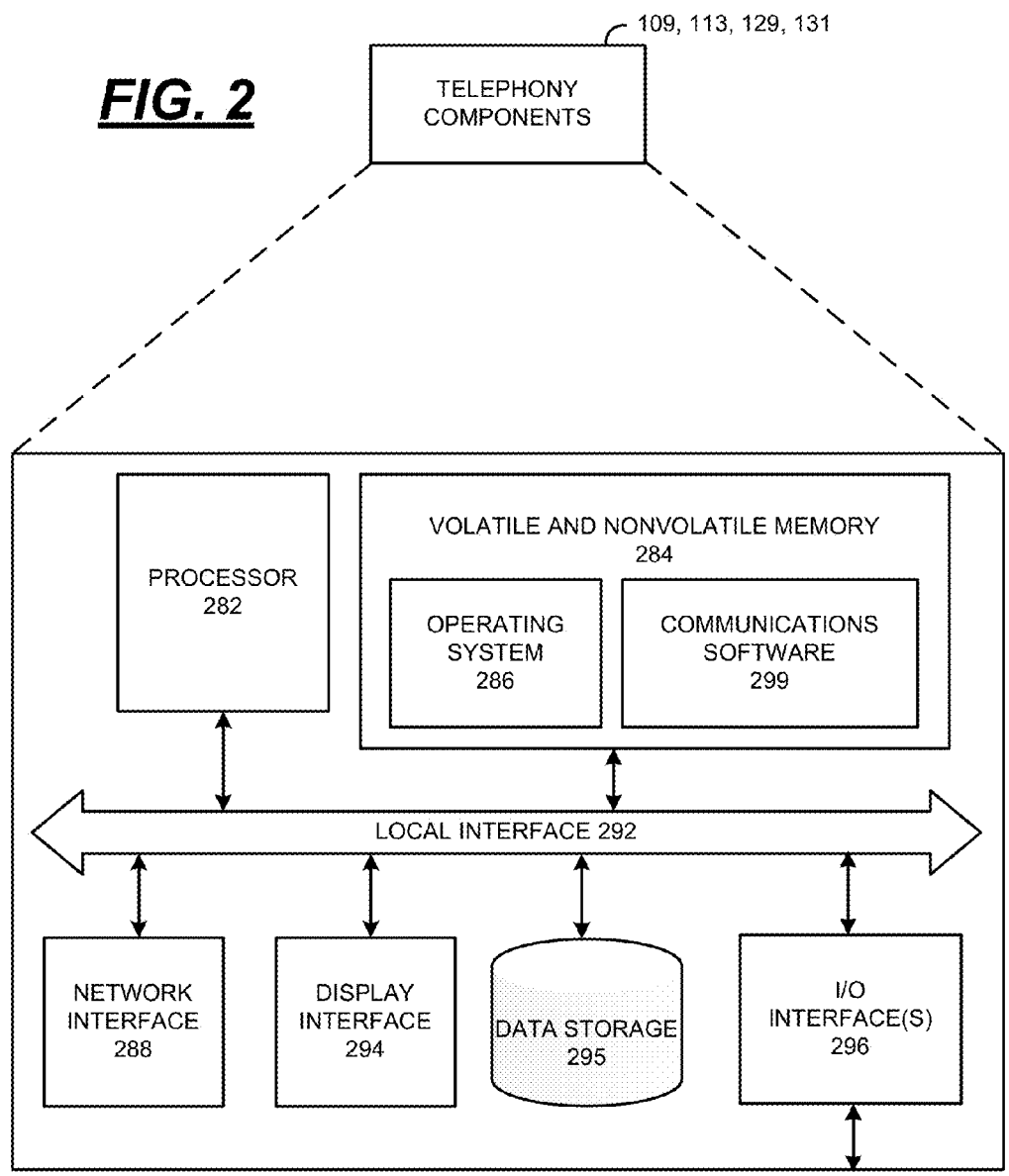
FIG. 2 is an exemplary diagram illustrating an embodiment of a telephony component that can be configured to facilitate recording of a communication in a communications network, such as that shown in FIG. 1.

FIG. 2 is an exemplary diagram illustrating an embodiment of a telephony component 109, 113, 126, 129, 131 that can be configured to facilitate recording communication in a communications network, such as that shown in FIG. 1. Although a wire-line device is illustrated, this discussion can be applied to any device. Generally, in terms of hardware architecture, as shown in FIG. 2, each component 109, 113, 126, 129, 131 can include a processor 282, volatile and nonvolatile memory 284, a display interface 294, data storage 295, and one or more input and/or output (I/O) device interface(s) 296 that are communicatively coupled via a local interface 292. The local interface 292 can include, for example, but not limited to, one or more buses or other wired or wireless connections. The local interface 292 may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor 282 can be a hardware device for executing software, particularly software stored in the volatile and nonvolatile memory 284. The processor 282 can be any custom made or commercially available processor, a central processing unit (CPU), an auxiliary processor among several processors associated with the telephony component 109, 113, 126, 129, 131, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 284 can include any one or combination of volatile memory elements (e.g., random access memory (RAM), such as DRAM, SRAM, SDRAM, etc.) and nonvolatile memory elements (e.g., read-only memory (ROM), hard drive, tape, CDROM, etc.). Moreover, the memory 284 can incorporate electronic, magnetic, optical, and/or other types of storage media. Note that the volatile and nonvolatile memory 284 can have a distributed architecture, where various components are situated remote from one another, but can be accessed by the processor 282.

The software in the volatile and nonvolatile memory 284 may include one or more separate programs, each of which includes an ordered listing of executable instructions for implementing logical functions. In the example of FIG. 2, the software in the volatile and nonvolatile memory 284 may include communications software 299, as well as an operating system 286. The communications software 299 can include logic configured to adjust packet size, change codec type, and mix communications data for transmission over a data network, as well as logic configured to otherwise facilitate a communication. As a nonlimiting example, embodiments of communications software 299 are configured to increase or decrease the packet size, change codec type, and mix the communications data to improve performance of the recorders and network.

Similarly, with respect to operating system 286, a nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX® operating system, which is a freeware that is readily available on the Internet; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc. and Windows CE® available from Microsoft® Corporation). The operating system 286 can be configured to control the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 284, so as to operate properly in connection with the Operating System 286.

The Input/Output devices (not shown) that can be coupled to the I/O Interface(s) 296 can include input devices, for example, but not limited to, a keyboard, mouse, scanner, microphone, headset, handset, microphone, earphone, etc. Further, the Input/Output devices can also include output devices, for example, but not limited to, a printer, display, etc. Finally, the Input/Output devices can further include devices that communicate both as inputs and outputs, for example, but not limited to, a modulator/demodulator (modem; for accessing another device, system, or network), a radio frequency (RF) or other transceiver, a telephonic interface, a bridge, a router, etc.

If the telephony component 109, 113, 126, 129, 131 is a personal computer, workstation, or the like, the software in the volatile and nonvolatile memory 284 can further include a basic input output system (BIOS) (omitted for simplicity). The BIOS is a set of software routines that initialize and test hardware at startup, start the Operating System, and support the transfer of data among the hardware devices. The BIOS is stored in ROM so that the BIOS can be executed when the telephony component 109, 113, 126, 129, 131 is activated.

When the telephony component 109, 113, 126, 129, 131 is in operation, the processor 282 is configured to execute software stored within the volatile and nonvolatile memory 284, to communicate data to and from the volatile and nonvolatile memory 284, and to generally control operations of the communications device 106 pursuant to the software. Software in memory, in whole or in part, are read by the processor 282, perhaps buffered within the processor 282, and then executed.

Figure 3:
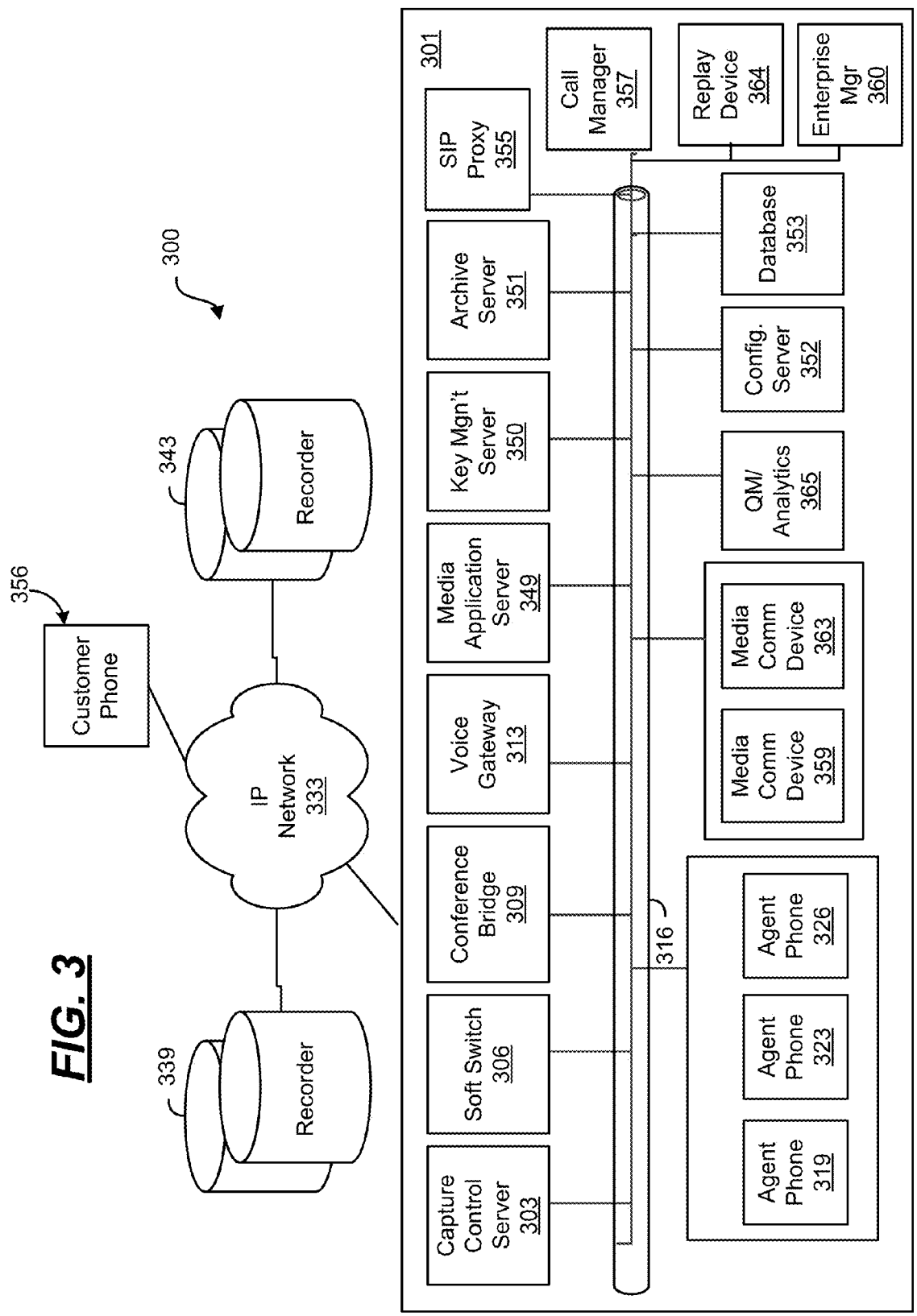
FIG. 3 is a schematic diagram of an embodiment of a system in which a communication can be securely recorded.

FIG. 3 is a schematic diagram of an embodiment of a system 300 in which communication can be securely recorded by a recorder 339, 343 in a customer center using a capture control server 303, soft switch 306, conference bridge 309, agent phones 319, 323, 326, media communication devices 359, 363, voice gateway 313, and media application server 349, respectively, via an IP network 333 or any communications network. The capture control server 303, soft switch 306, conference bridge 309, agent phones 319, 323, 326, media communication devices 359, 363, voice gateway 313, and media application server 349 communicate with each other in a telephony system 301 via a company network 316. The company network 316 and IP network 333 can include, but are not limited to, a wide area network (WAN), a local area network (LAN), a virtual private network (VPN) and the Internet.

Spanning

In order to record the data associated with communications at the customer center using passive tapping, recorders are deployed at the media processing device or distribution devices using a SPAN feature on these devices. These tapping features are often available to the recorders that are directly connected to the media processing device or distribution devices, namely to recorders deployed at each branch office. The devices using the SPAN features can include, but are not limited to switch 306, voice gateway 313, and media application server 349. The SPAN devices can communicate with each recorder 339, 343 to determine whether the SPAN devices can be configured to adjust the packet size of the communications data. The recorder 339, 343 can request the SPAN devices to generate a certain packet size of the communications data to improve, e.g., optimize, the performance of the recorder. For example, the packet size can be adjusted to be, for example, 20 ms, 180 ms, or 1 second (s) of audio data in a single frame, which is then transmitted over the network using a real-time transport protocol (RTP) using, for example, a G.711 or G.729—both are standards for audio coding. In general, a packet size of approximately greater than 160 millisecond (ms) of communications data facilitates reducing the number of times the recorder processes a packet of communications data.

Alternatively or additionally, the SPAN devices can obtain information associated with the transmission bandwidth of the network via a network server (not shown). The SPAN devices can be configured to adjust the packet size of the communications data to improve, for example, the transmission bandwidth of the network. For example, at a central office of a customer center, the packet size can be increased because the transmission bandwidth of the network at the central office can sustain the increased packet size without diminishing the performance of the network. On the other hand, at a branch office with typically less transmission bandwidth than the central office, the packet size can be decreased to avoid diminishing the performance of the network.

Alternatively or additionally, the SPAN devices can further be configured to change the codec type of the communications data to improve the performance of the recorder. The type of codec includes, but is not limited to, G711 format, G729 format, moving picture experts group audio layer 3 (MP3) and Windows® media audio (WMA), among others. Alternatively or additionally, the SPAN devices can further be configured to mix at least two audio streams of the communications data into one stream and transmit the mixed audio stream to the recorder. This can increase the performance of the recorder by enabling the recorder to focus on recording the mixed audio stream rather than mixing the audio streams.

Alternatively or additionally, if the SPAN devices determine that the audio streams are to be processed for speech recognition based on a business policy, the SPAN devices may not mix the audio streams and transmits the two audio streams to a recorder from which the two audio streams can be retrieved by a speech recognition server.

Conferencing

In another scenario, for example, each recorder 339, 343 can communicate with the conference bridge 309 to determine whether the conference bridge 309 can be configured to adjust the packet size and/or change the codec type of the communications data. In this embodiment, calls from the customer phone (not shown) can be routed to a voice gateway 313, which can route the calls to the soft switch 306. The soft switch 306 receives incoming calls and routes the calls to the agent phones 319, 323, 326. The soft switch 306 communicates with the conference bridge 309 via the company network 316.

The soft switch 306 is operative to send a command to the agent phones 319, 323, 326 and voice gateway 306 via the company network 316, instructing the agent phones 319, 323, 326 and voice gateway 306 to transmit the communications data associated with the calls through the conference bridge 309 via the company network 316. The recorders 339, 343 can communicate with the conference bridge via the IP network 333 and the company network 316 to determine a desired, e.g., optimal, packet size and codec type of the communications data based on the capabilities of the recorders 339, 343.

Once the conference bridge 309 determines the desired packet size and codec type of the communications data for the recorders 339, 343, the conference bridge 309 receives the communications data from the agent phones 319, 323, 326 and voice gateway 306, adjusts the packet size and/or changes the codec type according to the determined packet size and codec type, respectively. Alternatively or additionally, the conference bridge 309 can adjust the packet size of the communications data to improve, for example, the transmission bandwidth of the networks 316, 333. Alternatively or additionally, the conference bridge 309 can further be configured to mix at least two audio streams of the communications data into one stream and transmit the mixed audio stream to the recorder.

Alternatively or additionally, the conference bridge 309 can determine whether the agent phones 319, 323, 326 and voice gateway 313 can adjust the packet size, change codec type and/or mix media streams. Responsive to determining that the agent phones 319, 323, 326 and voice gateway 313 have the capabilities, the conference bridge 309 can request the agent phones 319, 323, 326 and voice gateway 313 to adjust the packet size, change codec type and/or mix media streams and transmit the modified communications data to the conference bridge 309. The conference bridge 309 then transmits the modified communications data to the recorders 339, 343 to record the modified communications data in optimal fashion.

Duplicate Media Streaming

In another scenario, for example, each recorder 339, 343 can communicate with a duplicate media streaming (DMS) device to determine whether the DMS device can be configured to adjust the packet size and/or change the codec type of the communications data. In general, the DMS device can receive, duplicate and transmit the communications data to the recorder 339, 343 without using the conference bridge 309. The DMS device includes, but is not limited to, the soft/IP phone 319, 323, 326, soft switch 306, voice gateway 313, and media application server 349, among others.

In some implementations, duplicate media streaming (DMS) may be used as a recording method in addition to a passive tap method. A call manager 357 may initiate call recording at the start of calls placed to the system 300. The call manager 357 may be a Cisco Unified Communications Manager, Version 6.0 (or higher). When the call arrives, the call manager 357 informs the soft/IP phone 319, 323, 326 that its internal built in bridge is to duplicate the media streams. The call manager 357 may the initiates a link to the recorder 339, 343 through the services of an SIP proxy 355. The SIP proxy 355 provides for the setup of SIP calls in the network 316. Once the SIP proxy 355 determines the target recorder 339, 343, RTP streams are initiated between the soft/IP phone 319, 323, 326 and the recorder 339, 343. The system 300 receives tagging from the recording streams, which may be enhanced through additional tags from a JTAPI (Java Telephony API) integration.

In a second mode of operation, a recording application may request a line to be recorded. In this mode, an initiating message is sent from the recording application to the call manager 357. As such, the recording can be started at any point during the call, whereas in the first mode above, the call manager 357 initiated recording occurs at the beginning of the call.

Soft/IP Phones

In one scenario, for example, each recorder 339, 343 can communicate with the agent phones 319, 323, 326 in a spanning environment to determine whether the phones can be configured to adjust the packet size of the communications data. The recorder 339, 343 can request the agent phones 319, 323, 326 to generate a certain packet size of the communications data to improve the performance of the recorder.

Alternatively or additionally, the phones 319, 323, 326 can obtain information associated with the transmission bandwidth of the network via a network server (not shown). The phones 319, 323, 326 can be configured to adjust the packet size of the communications data to improve the performance of the network.

Alternatively or additionally, the agent phones 319, 323, 326 can further be configured to change the codec type of the communications data to improve the performance of the recorder. Alternatively or additionally, the agent phones 319, 323, 326 can further be configured to mix at least two audio streams of the communications data into one stream and transmit the mixed audio stream to the recorder.

Soft Switch

In general, calls from a customer phone can be routed to the voice gateway 313, which can route the calls to the soft switch 306. The soft switch 706 receives incoming calls and routes the calls to the agent phones 319, 323, 326. The soft switch 306 can duplicate and transmit the communications data associated with the calls to the recorders 339, 343 using the IP network 333. The recorders 339, 343 can communicate with the soft switch 306 via the IP network 333 and the company network 316 to determine the desired packet size and codec type of the communications data based on the capabilities of the recorders 339, 343. The recorders 339, 343 can use Session Initiation Protocol (SIP) or a computer telephony integration (CTI) link to communicate with the soft switch 306.

Once the soft switch 306 determines the desired packet size and codec type of the communications data for the recorders 339, 343, the soft switch 306 receives the communications data from the voice gateway 306, adjusts the packet size and/or changes the codec type according to the determined packet size and codec type, respectively. Alternatively or additionally, the soft switch 306 can adjust the packet size of the communications data to improve, for example, the transmission bandwidth of the network. Alternatively or additionally, the soft switch 306 can further be configured to mix at least two audio streams of the communications data into one stream and transmit the mixed audio stream to the recorder.

Alternatively or additionally, the soft switch 306 can determine whether the voice gateway 313 can adjust the packet size, change codec type and/or mix media streams. Responsive to determining that the voice gateway 313 has the capabilities, the soft switch 306 can request the voice gateway 313 to adjust the packet size, change codec type and/or mix media streams and transmit the modified communications data to the soft switch 306. The soft switch 306 then transmits the modified communications data to the recorders 339, 343 to improve the performance of the recorders 339, 343 to record the modified communications data.

Media Application Server

In general, the media application server 349 receives incoming media communications, identifies the type of media communications, and routes the media communications to media communication devices 359, 363 via the company network 316. The media application server 349 can send a command to the media communication devices 359, 363 via the company network 316, instructing the media communication devices 359, 363 to transmit the media communications through the media application server 349 via the company network 316. The media application server 349 duplicates and transmits the media communications to the recorders 333, 343 using the IP network 333. The recorders 339, 343 can communicate with the media application server 349 via the IP network 333 and the company network 316 to determine the desired packet size and codec type of the communications data based on the capabilities of the recorders 339, 343.

Once the media application server 349 determines the desired packet size and codec type of the communications data for the recorders 339, 343, the media application server 349 receives the communications data from the media communication devices 359, 363, adjusts the packet size according to the determined packet size and/or changes the codec type according to the determined codec type. Alternatively or additionally, the media application server 349 can adjust the packet size of the communications data to improve, for example, the transmission bandwidth of the network.

Alternatively or additionally, the media application server 349 can determine whether the media communication devices 359, 363 can adjust the packet size, change codec type and/or mix media streams. Responsive to determining that the media communication devices 359, 363 have the capabilities, the media application server 349 can request the media communication devices 359, 363 to adjust the packet size, change codec type and/or mix media streams. The media communication devices 359, 363 then transmit the modified communications data to the media application server 349. The media application server 349 then transmits the modified communications data to the recorders 339, 343 to improve the performance of the recorders 339, 343 to record the modified communications data.

Voice Gateway

The voice gateway 313 can perform the functions of duplicating and transmitting the communications data to the recorders 339, 343. For example, the voice gateway 313 receives instructions to record communications data from the soft switch 306. The voice gateway 313 receives, manages, and routes the communications data to the agent phones 319, 323, 326 via the company network 316. The voice gateway 313 determines whether to record the received communications data at the agent phones 319, 323, 326 according to the received instructions. If the voice gateway 313 determines that the communications data are to be recorded, the voice gateway 313 duplicates and transmits the communications data to the recorders 339, 343, using the networks 316, 333.

The recorders 339, 343 can communicate with the voice gateway 313 via the IP network 333 and the company network 316 to determine the desired packet size and codec type of the communications data based on the capabilities of the recorders 339, 343. Once the voice gateway 313 determines the desired packet size and codec type of the communications data for the recorders 339, 343, the voice gateway 313 receives the communications data from the agent phones 319, 323, 326, adjusts the packet size according to the determined packet size and/or changes the codec type according to the determined codec type.

Alternatively or additionally, the voice gateway 313 can adjust the packet size of the communications data to improve, for example, the transmission bandwidth of the network. Alternatively or additionally, the voice gateway 313 can determine whether the agent phones 319, 323, 326 can adjust the packet size, change codec type and/or mix media streams. Responsive to determining that the agent phones 319, 323, 326 have the capabilities, the voice gateway 313 can request the agent phones 319, 323, 326 to adjust the packet size, change codec type and/or mix media streams. The agent phones 319, 323, 326 then transmit the modified communications data to the voice gateway 313. The voice gateway 313 then transmits the modified communications data to the recorders 339, 343 to improve the performance of the recorders 339, 343 to record the modified communications data.

Alternatively or additionally, the voice gateway 313 is operative to be configured to duplicate the communications data and transmit the duplicated communications data to a second voice gateway (not shown). The second voice gateway transmits the duplicated communications data to a desired endpoint component, such as the recorders 333, 343, using one of an endpoint component name, an IP address, a SIP address, and a domain name system (DNS) name of the desired endpoint component across the company and/or IP networks 316, 333. The second voice gateway can modify the duplicated communications data similar to the operations of voice gateway 313 explained above.

Storing and Forwarding

In another scenario, for example, each recorder 339, 343 can communicate with the capture control server 303 to determine whether a computing device having the capabilities of capturing screen and audio of the communications data can be configured to adjust the packet size and/or change the codec type of the communications data.

The media communication device 359, 363 can include, but not limited to, a computing device. The media communication devices 359, 363 can be coupled to the agent phone 319, 323, 326 via the network 316. Alternatively or additionally, although not shown, media communication devices 359, 363 can be directly coupled to the agent phone 319, 323, 326 without using the company network 316. The media communication devices 359, 363 is further configured to send at least a portion of communications data to the recorders 339, 343. The media communication devices 359, 363 includes a screen capture daemon configured to facilitate capture of visual data related to the communications data, a capture control daemon configured to assemble communications data into data streams, and a voice capture daemon configured to facilitate capture of audio data. A capture control server 303 communicates with the media communication devices 359, 363 and is configured to provide a command to the computing device. The recorders 339, 343 can communicate with the capture control server 303 via the IP network 333 and the company network 316 to determine the desired packet size and codec type of the communications data based on the capabilities of the recorders 339, 343.

Once the capture control server 303 determines the desired packet size and codec type of the communications data for the recorders 339, 343, the capture control server 303 communicates with media communication devices 359, 363 to determine whether the media communication devices 359, 363 can adjust the packet size, change codec type and/or mix media streams. If the media communication devices 359, 363 has the capabilities, the capture control server 303 transmits a command associated with the determined packet size and codec type of the communications data. Responsive to receiving the command, the media communication devices 359, 363 receives the captured communications data from the agent phones 319, 323, 326, voice gateway 306 and media application server 349, adjusts the packet size according to the determined packet size and/or changes the codec type according to the determined codec type.

Alternatively or additionally, the media communication devices 359, 363 can adjust the packet size of the communications data to improve the capabilities of the network, e.g., transmission bandwidth. Alternatively or additionally, the media communication devices 359, 363 can determine whether the agent phones 319, 323, 326, voice gateway 313, and media application server 349 can adjust the packet size, change codec type and/or mix media streams.

Responsive to determining that the agent phones 319, 323, 326, voice gateway 313, and media application server 349 have the capabilities, the media communication devices 359, 363 can request the agent phones 319, 323, 326, voice gateway 313, and media application server 349 to adjust the packet size, change codec type and/or mix media streams and transmit the modified communications data to the media communication devices 359, 363. The media communication devices 359, 363 then captures the modified communications data and transmits the captured communications data to the recorders 339, 343 to improve the performance of the recorders 339, 343 to record the modified communications data. Alternatively or additionally, the media communication devices 359, 363 can forward the stored communications data from one recording system to another recording system.

Encryption

Figure 4:
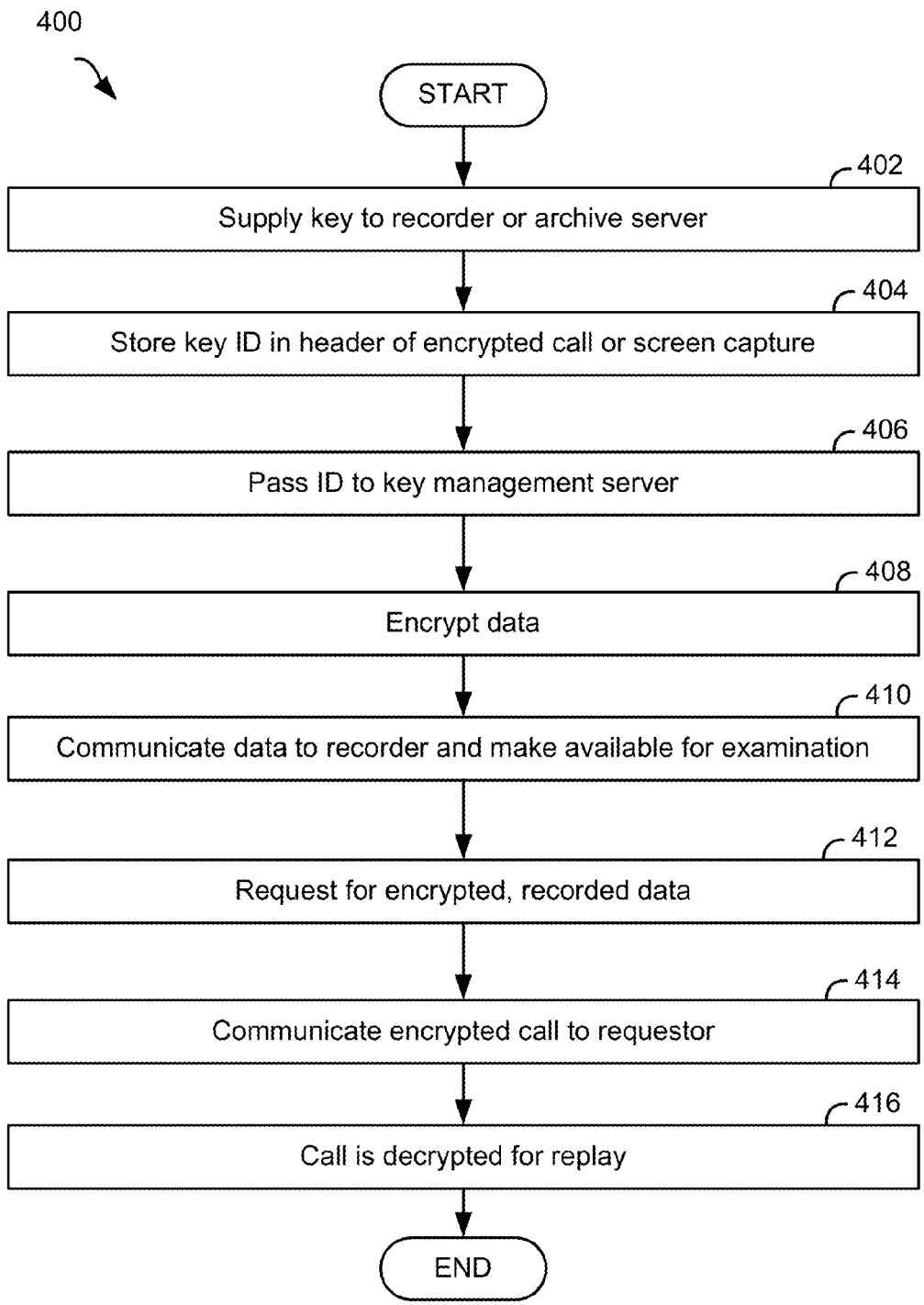
FIG. 4 illustrates an exemplary operational flow for encrypting data in transit and at rest in the system of FIG. 3.

With additional reference to FIG. 4, in some implementations, encryption may be used on the recorders 339, 343 to provide for compliance and data protection. In some implementations, the recorders 339, 343 may encrypt recorded data and protect the recorded data when in transit. Such compliance may be required in systems 300 where, e.g., credit cards are involved in transactions. The encryption may protect customer data on media archived on, e.g., an archive server 351 (described below) that may be off-site. The encryption further secures customer data from non-authorized access and interception on the network.

FIG. 4 illustrates an exemplary operational flow 400 for encrypting data in transit and at rest in the system 300. Initially, at 402, a key for the encryption is supplied to the recorder 339, 343 or the archive server 351. The key may be supplied by a key management system running on the a key management server 350 (described below). At 404, the ID of the key is stored in the header of the encrypted call or screen capture. At 406, the ID is passed back to the key management server 350 whenever the key is required for decryption. In some implementations, the key can only be requested by trusted parties to the key management server 350.

At 408, data to be recorded is encrypted. This may be performed using a symmetrical key cipher using the AES256 standards. The encryption may be performed by a capture engine prior to writing the call to disk. Voice, screen and associated XML files may be encrypted. The capture engine may be present in the media controlling/processing/distributing devices 113, 131 and may consolidate receiving and recording various types of communication signals into a recording system (e.g., recorders 339, 343). In some implementations, transitional data on disk, such as caches, may be protected through the Windows Encrypted File System (EFS) that enables these areas to be encrypted at a file system level, rather than encryption keys provided by the key management server 350.

In some implementations, the capture engine includes various types of communication interfaces that facilitate receiving and recording various types of communication signals. For example, the capture engine may include a media channel framework which includes an E1/T1 trunk tap interface, A/D extension tap interface, TDM terminated interface, screen capture interface, voice over IP (VoIP) filter interface and local storage interface. The E1/T1 trunk tap interface can communicate with an AiLogics and Intel E1/T1 tap; the A/D extension tap interface can communicate with an AiLogics digital/analog passive tap; and the TDM terminated interface can communicate with an AiLogics and Intel E1/T1 terminated. The screen capture interface can communicate with software running on the agent's desktop (agent phones 319, 323, 326 or media communication devices 359, 363), the IP Terminated interface can communicate with an SIP extension; the VoIP filtering interface can decode with a SCCP, SIP, or other similar protocol; and network cards (not shown) can receive 32-bit and 128-bit communication format At 410, the encrypted data is communicated to the recorder 339, 343. The data is recorded and made available for examination by authorized users. In some implementations, the recorders 339, 343 and central archive server 351 are the trusted devices in the system 300. For a call for which replay has been requested that is encrypted, the trusted devices may examine the call, extract the Key ID and pass this to the key management server 350 to obtain the decryption key. Once supplied, the trusted devices may decrypt the call for replay. To protect recorded agent screen images when transmitted over the networks from agent desktops to recorders, the captured screen images may be encrypted using standard AES256 algorithm before sending to the recorders 339, 343. In addition, configuration communications over the network 316 from a configuration server 352 may also be protected via SSL links.

At 412, the recorders 339, 343 a request for a recorded, encrypted call is received. The request may come in from an authorized user or the archive server 351. At 414, the recorded, encrypted call is communicated to the requestor. In some implementations, the recorders 339, 343 do no decrypt the call when the call is requested by archive server 351 or stored on local archive media. In some implementations, to ensure that the data remains secure, the network connections between devices may be encrypted using SSL techniques.

At 416, the call is decrypted for replay. Because of the centralized nature of the key management server 350, the call can be located anywhere in the system 300, for instance on a DVD that has moved to a central site. The decryption may be performed by contacting the key management server 350 using the ID of the key used to encrypt the recording. The ID may be used by the key management server 350 to obtain the original key used for encryption. The play back may be performed at a replay device 364. In some implementations, with the proper security, the requestor may export the recording to non-system users by converting the encrypted call into, e.g., an AVI (audio video interleaved) media file containing all voice and data.

Referring again to FIG. 3, the key management application in the key management server 350 manages the keys used across the system 300. The key manager server 350 securely stores, generates, manages and brokers access to cryptographic keys. The key manager server 350 may include a database server 353 that provides database services for an key manager deployment. The database server 353 may host a datastore and keystore. The datastore is a persistent storage area for all administrative and operational information. The keystore is a database for storage of cryptographic keys. All keys are stored in encrypted form, e.g., encrypted using a key encryption key (KEK).

The key manager server 350 enables the encrypted recordings to be moved, archived and stored throughout the system 300, but still be replayed by authorized users. In some implementations, the recordings in transit, i.e. between the recorders 339, 343 and the archive server 351 may remain encrypted in their original form. Recordings for replay may be decrypted, when appropriate and then protected to the point of replay using encrypted streams through the use of HTTPS. The end to end encryption system is designed to help customers meet the Payment Card Industries (PCI) requirements.

The archive server 351 may provide an archive of recorded calls and screens. The archive sever 351 may have the same local archive capabilities as the recorders 339, 343. As such, the archive server 351 may write to the media supported by the recorders 339, 343, including, DVD-RAM, DVD+/−RW, DAT 72 tapes, Iomega Rev drives, Sony AIT tape drives, EMC Centera, and SAN/Disk.

The media controlling/processing/distributing devices 113, 131 may access this media from any archive server 351 or recorder 339, 343, which will enable the calls located on the media to be replayed. Retention periods may be supported on file system storage. Calls over the retention period may be deleted from the system 300 automatically.

Tamper Protection

Figure 5:
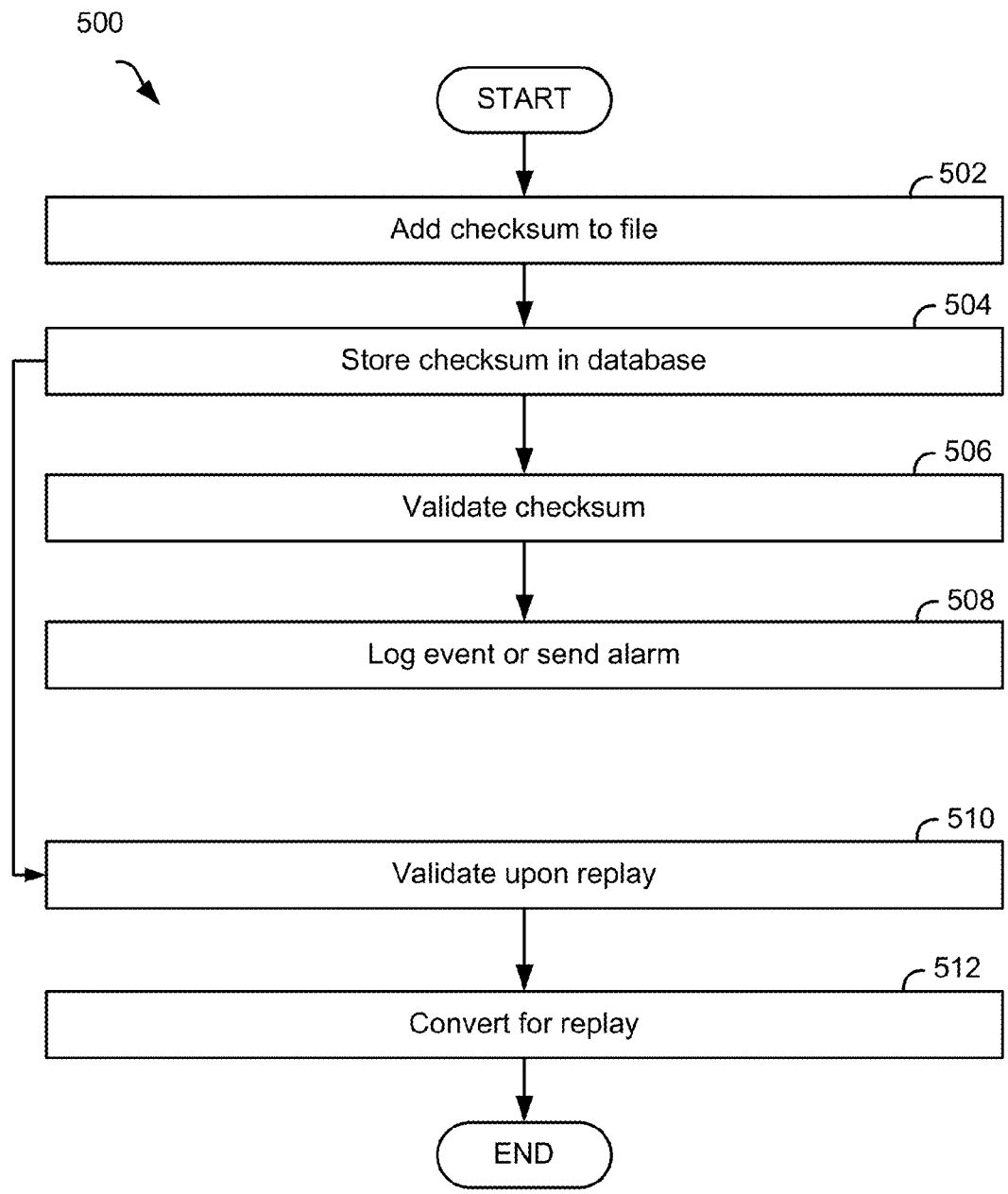
FIG. 5 illustrates an exemplary operational flow for fingerprinting data in the system of FIG. 3.

With additional reference to FIG. 5, in some implementations, the system 300 may detect tampering of files and data on the recorder 339, 343.

FIG. 5 illustrates an exemplary operational flow 500 for fingerprinting data in the system 300. At 502, a checksum is added to files and data. The checksum may be added to configuration files, recordings, screen captures or other media types. The fingerprinting may be initially performed by the capture engine in the media controlling/processing/distributing devices 113, 131. If the recorded data needs to be compressed (e.g. for certain calls recorded by the recorder), the compressor may recalculate the checksum after compression.

At 504, the checksum is maintained in a database by the system 300. At 506, the file is validated. For example, if the file is manually edited, this action will be noticed due to the incorrect checksum. Where manual modification is required for support purposes a command line tool may enable the file to have a new checksum determined and stored in the database. This tool may create an audit event also so that the change is noted. This fingerprint can be validated through the use of a fingerprint validation utility built into a diagnostic application. Fingerprinting the files may be performed as a two stage process. First, a checksum may be calculated for of the recorded data, including the textual header that contains time of recording etc., using the SHA-256 algorithm. The SHA (Secure Hash Algorithm) family is a set of related cryptographic hash functions. The SHA algorithm is commonly used in large variety of popular security applications and protocols. The SHA algorithms were designed by the National Security Agency (NSA) and published as a US government standard. The SHA-256 algorithm can be performed on files, text strings as well as Hex strings. The SHA-256 produces an output of 256-bit hash value. Next, the checksum may be signed by a trusted application by encrypting the checksum using the AES-256 algorithm and the checksum stored in the header of the file.

At 508, an alarm may be raised and an audit event may be logged. This feature supports the PCI initiative and improves security of the system 300. It also minimizes the possibility of fraud through the manipulation of the recorders 339, 343.

At 510, the validation process may be used to validate that a call or screen has not been tampered with during replay. The validation process may be performed as follows. A user with administration rights may log into the replay device 364. Within an administration interface, a "download contact" option may be provided. The administrator may enter an identifier of the call in question. The system 300 displays the identifier of the call or a list of the stitched "hidden" identifiers that make that call. The administrator can then select which identifier to download and the file will be downloaded to, e.g., a personal computing device.

The call and/or screen can then be played through a player application. The application validated the signing and value of the checksum in the file against the data in the file (or database) to indicate if the file has been tampered with. In a standalone player, the files may be transported and replayed anywhere (e.g., such as in court), and the player may replay the call and provide evidence that the call's fingerprint is correct.

At 512, the system 300 may then convert a call to a suitable format for replay. In some implementations, the system 300 may change the format of the call for export and not necessarily issue the original "as-recorded" file. Access to such original calls may be restricted, as a result the validation of a call may be restricted to someone with administration access to a reply server or the recorder 339, 343

Recorder Features

In some implementations, a mechanism may be provided to start and stop audio and/or desktop recording based on activities occurring on the agent's desktop (e.g., agent phone 319, 323, 326, and/or media communications device 359, 363). The recording of the desktop and/or audio may be stopped, together or independently, based on the user navigating to a particular screen or selecting a particular field for entry. Subsequently, recording of the desktop and audio can resume, together or independently, when the person leaves the particular screen or the data of concern has been removed from the screen. This feature is useful to prevent the capture of sensitive information that may need to be entered on the screen or discussed over a call segment.

Auditing

Auditing may be provided to include auditing the changes to the configuration settings on the recorder 339, 343 or inside an enterprise manager (EM) 360. Changes to the configuration settings on the recorder 339, 343 are first stored locally, and at periodic intervals collected by the enterprise manager 360 for consolidation in the database 353. The files in which the audit entries are stored on the recorder 339, 343 are pulled by EM 360 based upon a configurable value on file size or age of the file, etc. The audit changes may be viewed from the replay device 364.

Audit events stored on the recorder 339, 343 may be watermarked to prevent any tampering. A configuration change made on the recorder 339, 343, such as changing voice card information, resetting alarm or any other configuration change may be audited. This supports PCI security requirements and provides key forensic information for fraud detection.

In some implementations, alarms may be generated, and an e-mail alert made if communication has been lost with a recorder 339, 343. This will enable an IT department to be alerted to the potential total loss of a recorder 339, 343 through, e.g., a power failure in addition to indicating a network issue between the systems. To improve the robustness of the solution to environmental changes and unusual events within the system a number of additional alarms may be provided to check for the system 300 potentially operating out of bounds.

An alarm may be raised when no recording or less than expected recording during a configured time period occurs. The system 300 may provide for start and end times on a per day basis to determine when the recorder 339, 343 would be expected to be operational. A threshold of the minimum expected number of recordings is then set and measured over, e.g., an hour.

The system 300 may monitor CPU usage for overload. For example, a 15 min period may be monitored and will alarm generated if this value is over the threshold. In further examples, the system may monitor the interrupt activity over a 15 min period produce alarm if this value is over the threshold. The system 300 may monitor internal disk queues to see if they are backing up, and may alarm if this time is over a threshold. Excessive queues are an indication of an issue with the disk subsystem. The system 300 may monitor physical memory used over a 15 min period and may alarm if this value is over the threshold.

Quality Monitoring

Quality monitoring may be performed as part of a workforce optimization strategy. Performance may be measured by recording the voice of the customer, the agent and/or media associated with a customer contact to assess service quality and the customer experience. E-learning and company-specific "best practices" make it possible to address skill and knowledge gaps efficiently and effectively, as well as quickly communicate policy or procedural changes across the center, enabling the contact center to achieve success in whatever terms it chooses to define. Quality monitoring scores, including insights from analytics and/or analytical analysis of structured, unstructured, or aggregated data, may be used as part of a workforce management to produce staffing models that prevent companies from unknowingly scheduling one shift with all the top performers, for example. As a result, workforce management may provide a higher level of consistent service across shifts.

By way of example, speech analytics can be used to compare a recorded interaction to a script (e.g., a script that the agent was to use during the interaction). In other words, speech analytics can be used to measure how well agents adhere to scripts; identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

Conditions and/or combinations of conditions may be established to evaluate contacts before, during and after a customer interaction. This enables the capture of specific interactions that help make informed business decisions, thereby improving the people, processes and technologies across an enterprise. The system uses conditions (business rules) to trigger an action, such as recording, notifying, and placing the contact in the correct folder(s) for review. In addition, the entire contact may be retained based on business rule conditions that occur prior to the contact (e.g., ANI, DNIS, agent ID, etc.), during the contact (priority, product request, etc.), or at the end of the interaction (completed sale, etc.).

In this regard, one or more of the various types of recording components disclosed above in the system 300 of FIG. 3 may be used to facilitate speech analytics. It should be noted that speech analytics can be used in conjunction with such screen data (e.g., screen data captured from an agent's media communication devices 359, 363) for evaluation, scoring, analysis, adherence and compliance purposes, for example. Such integrated functionality can improve the effectiveness and efficiency of, for example, quality assurance programs. For example, the integrated function can help companies to locate appropriate calls (and related screen interactions) for quality monitoring and evaluation. This type of monitoring improves the effectiveness and productivity of quality assurance programs.

In accordance with implementations herein, certain improvements may be made to quality monitoring of agents within a call center. An evaluation component within a quality monitoring/analytics application 365 operates to score agents in various categories, such as product knowledge, selling, listening, etc. Quality monitoring may support additional contact attribute fields that are automatically populated in an evaluation form that is associated with a contact. The additional attributes may consist of ANI, DNIS and Custom Attribute Fields, thereby enriching the amount of data that can be made easily available during the evaluation process.

The attributes can be added when designing the evaluation form and will be automatically populated from the contact attributes when a new evaluation is created. These attributes may remain associated with the evaluation throughout the lifecycle of the contact. Enterprise Reporting (ER) Data Warehouse, ad-hoc reporting data model, Agent Evaluation Report, and Agent Evaluation Batch Report now include these attributes as well.

Quality monitoring allows voice and text annotations to be added any recorded customer contact. Annotations may be defined as "private," which only the creator can see or hear, or "public," which makes it accessible by anyone with the proper level of security. Once an annotation is created, the entry may be added to the event list associated with that contact. When replaying a contact on the replay device 364, an annotation may be retrieved for review by selecting it from the events list for that customer interaction. When annotations are replayed, the system 300 forwards to the point within the contact where the annotation occurred. This provides for context to the annotation in the contact.

An entire customer interaction can be reviewed as it occurred (voice and data), including transfers, conferences (including all parties on the call), hold times (recording activity from the CSR's perspective), and consultations (CSRs return to an original call after placing a customer on hold). The call activity can be visually reviewed using the "energy envelope," which illustrates the audio volume from both parties on the call. This can rapidly indicate to the user where there are unusual or key points in the call, for instance, prolonged periods of silence or "music on hold." The user can then use the replay controls to move to the exact point in the call that he wishes to review and can undertake other replay functions, such as "start," "stop," and "pause."

Figure 6:
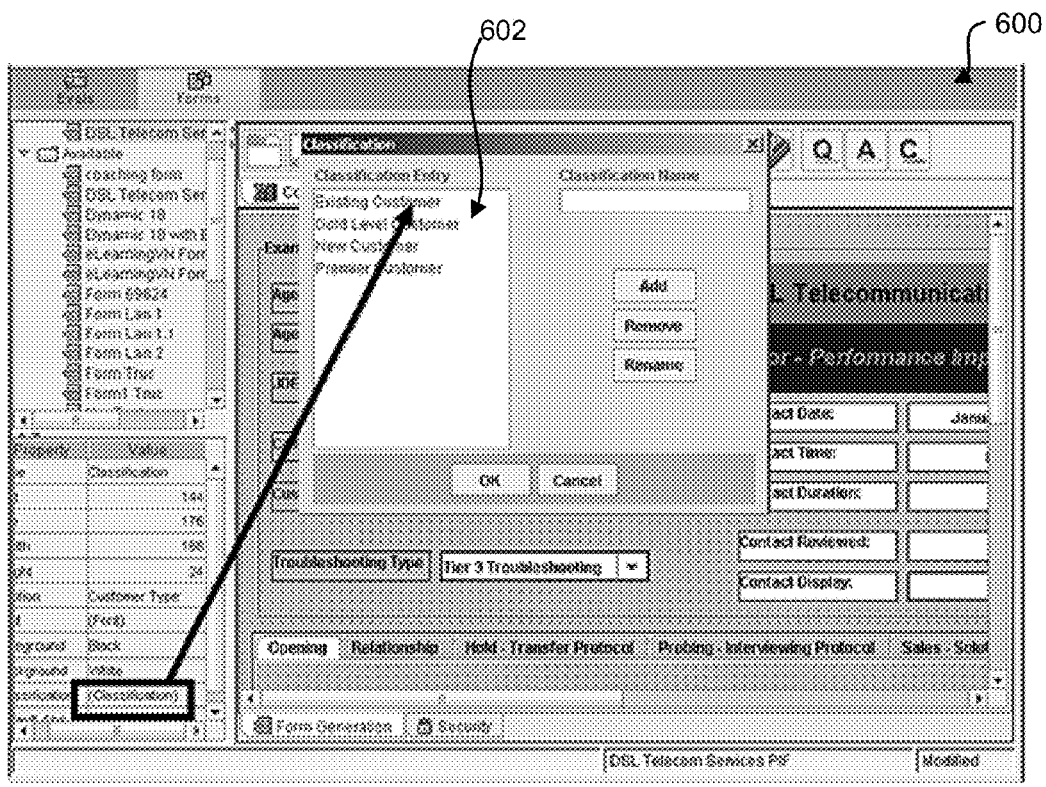
FIGS. 6 and 7 example user interfaces within the system of FIG. 3.

Referring to FIG. 6, there is illustrate an example user interface 600 in the system 300. In some implementations, the quality monitoring/analytics application 365 may provide for classifying an evaluation by allowing a classification item to be added to the evaluation form, similar to a question. As shown in FIG. 6, a classification may be assigned a set of attributes in a user interface 602 that can be chosen when completing the evaluation. Classification items may have no effect on scoring and multiple classifications may be added to the form. The classification may be presented show up in an agent evaluation report and agent batch evaluation report.

Figure 7:
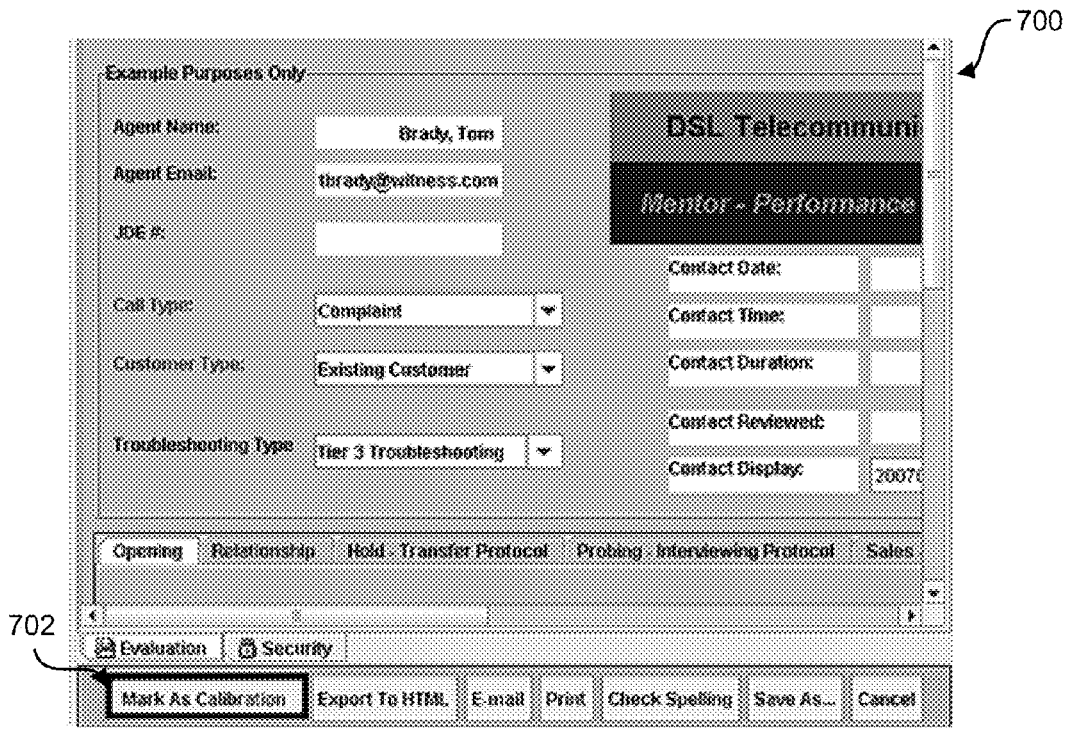

Referring to FIG. 7, there is illustrate an example user interface 700 in the system 300. In some implementations, evaluations may be marked as being used for calibration. An evaluation marked as calibration through a selection of box 702 will be excluded from being used in general reports for the agent or their scorecard. The field appears in the header of the evaluation form and may be off by default. If the evaluation is deemed calibration then the scorer sets this attribute. An evaluation tagged as calibration does not appear in a report run for that agent or in the agent's scorecard.

Contact Management

In some implementations, contacts may contain recorded content of varying types, e.g., synchronized voice and graphical data. However, contact attributes may be stored even if the content is not saved. This creates a database of business information about an organization's customer interactions.

When searching for contacts, a search dialog may support the following contact attributes: Contact Folder Name, Contact ID, Device Name, Device Extension, Groups, Agent Login, Agent Name, Agent ID, Supervisor Name, CTI ANI, CTI ANI 2 Digits, CTI Call Conference, CTI Call Direction, CTI DNIS, CTI Number Dialed, Started, and Duration.

Figure 8:
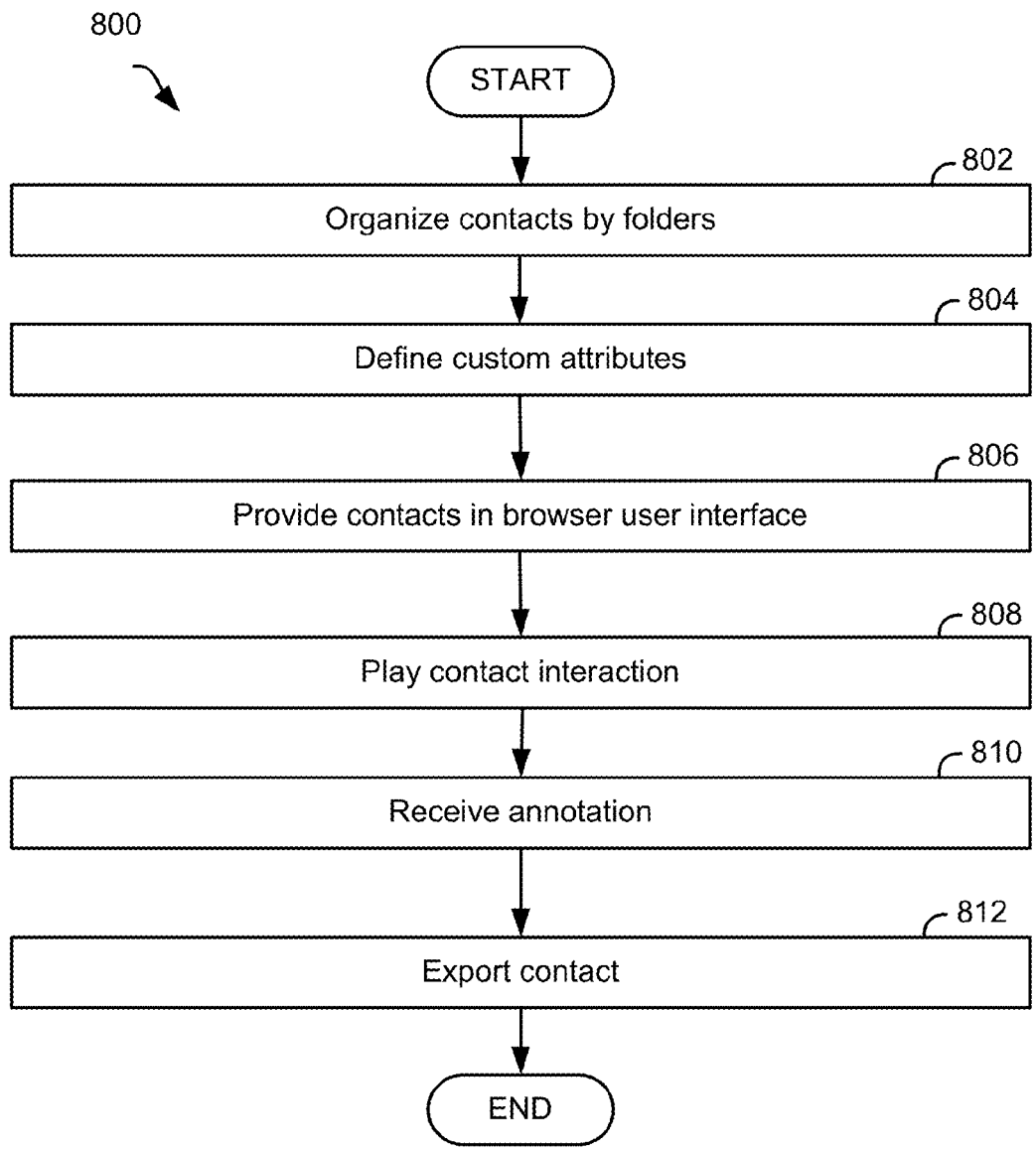
FIG. 8 illustrates an exemplary operational flow for a contact management in the system of FIG. 3.

Referring to FIG. 8, there is illustrated an exemplary operational flow 800 for contact management in the system 300. At 802, contact folders are created to enable contacts to be organized in a logical fashion. The folders allow a provider to store, via business rules, the recording of a contact in a folder that indicates the general nature of the contact. The following attributes may be configured to be displayed in the contact lists within the contact folders: Contact ID, Device Name, Device Extension, Agent Login (primary agent), Agent Name (primary agent), Agent ID (primary agent), Supervisor Name (primary agent's supervisor), CTI ANI, CTI ANI 2 Digits, CTI Call Conference, CTI Call Direction, CTI DNIS, CTI Number Dialed, Started, Duration, and Learning Lesson Management Learning Field. Permissions may be assigned to the contact folder. This allows access to be restricted to the contacts in that folder.

In some implementations, at 804, custom attributes within the contact folders may be defined. A custom attribute refers to a non-standard contact attribute and may be a contact provided via an e-mail, Web chat, or CRM integration. An example would be customer name and/or account number.

Figure 9:
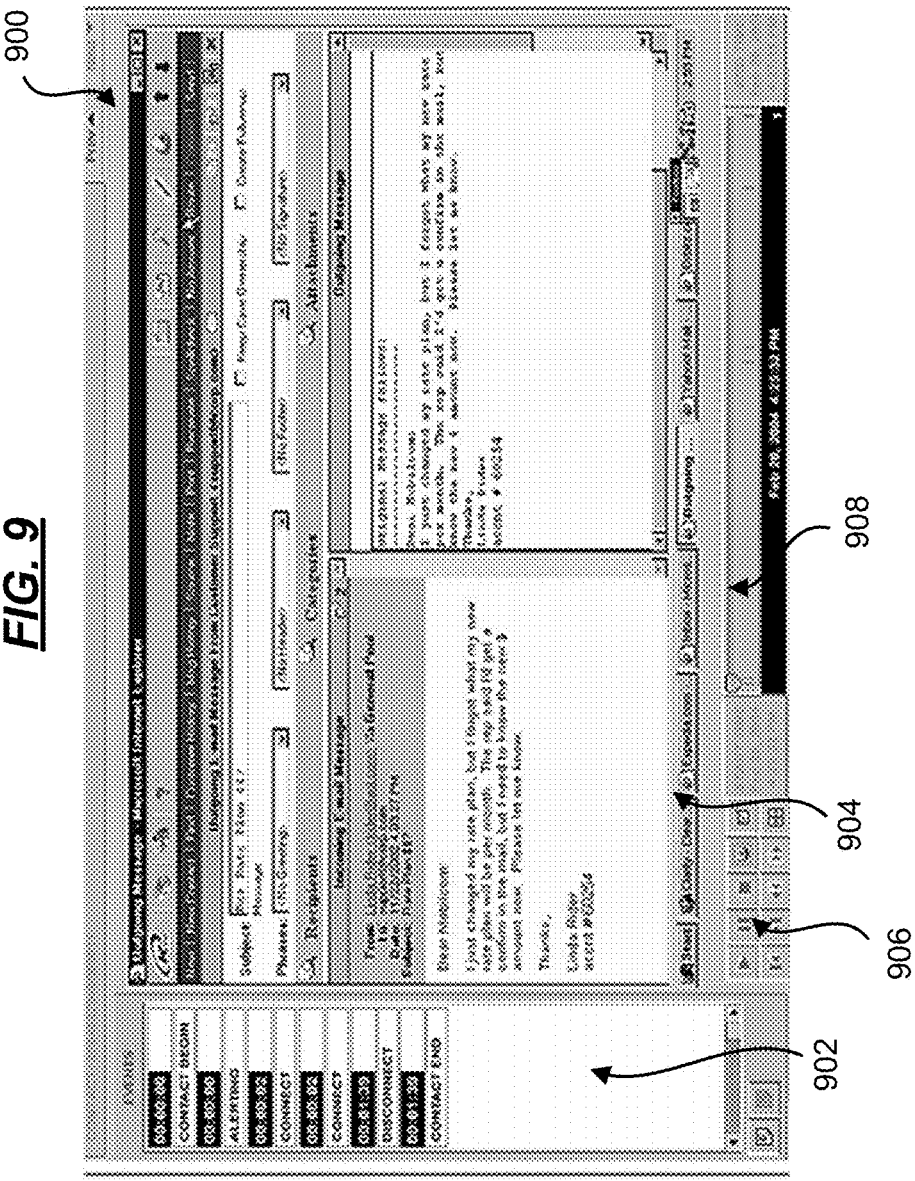
FIG. 9 illustrates an example browser-based user interface for viewing contacts in the system of FIG. 3.

At 806, contacts are provided in browser user interface for viewing. FIG. 9 illustrates an example browser-based user interface 900 for viewing contacts in the system 300. Users can review only those contacts within contact folders to which they have access. A playback window consists of an event viewer 902 on the left side of the window and a contact display 904 on the right. Double-clicking on a contact in the list will open that contact in the window 904.

At 808, a playback toolbar 906 allows a user to play, pause, rewind, and fast-forward the recording, as well as add annotations at any point in the record. A position indicator bar 908 next to the toolbar shows the point reached in the recording. Image scaling may compress the desktop screen view in such a manner that the agent's entire screen fits into the playback window 904 without having to rely on the use of scroll/slide bars. As the playback window may also resized, the corresponding image of the agent's desktop is also resized to maintain full visibility of the agent's desktop within the window.

Multimedia contact events (including after-contact wrap-up) may be displayed in the playback window 904 in chronological order. A user can review the contact for any event on the list. Events include transaction type indicators from multimedia contacts that enter the contact center, as well as any transaction initiated within the contact center.

The position indicator bar 908 on the replay user interface shows the point in the recording currently displayed in the playback window 904. The bar shows the duration of the contact, and during replay, the hh:mm:ss of the contact are displayed as the recording progresses. In addition to showing the point reached in the recording, this bar also allows the user to move to different places in the recording by skipping large amounts of time.

At 810, annotation may be received that allows the user to add commentary or explanatory notes while reviewing the recorded contacts. At any point during playback, the user can pause the recording and add annotations. When adding text or voice annotations, the system creates a new item in the event viewer that is indexed to the point in the contact record where you paused the playback. An annotation can be text or voice. Annotations can be public or private. Anyone with the appropriate access and security permissions can view or listen to public annotations. Private annotations are not shared and can be accessed only by the author.

At 812, the user can export contacts to non-system users. With the proper security, the system 300 converts the content into an AVI (audio video interleaved) or other media file containing the voice and data. The AVI files can then be distributed as required; e.g., via e-mail. Once exported, the AVI files can be played on any workstation with a Web browser and a media player, such as QuickTime®, Windows Media Player, RealPlayer®, etc. When exporting contacts, the following options may be available. A first is viewing the contact. After the user convert contacts to AVI files, the user can view these files in your media player by selecting the "View the Contact" option. The user can then create an e-mail message using your standard e-mail client application, attach the AVI files, and sent them to the desired recipient.

A second option is e-mailing the contact link. This option enables the user to create an e-mail that sends a hypertext link to the contact that has been converted to an AVI file. The recipient must have access to the Web server for the link to work One should also note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

What is claimed:

1. A method for protecting information provided during a communication session, said method comprising:
    recording the communication session at a recorder in a first recording mode in accordance with a rule, wherein the recorder has a telephony component to adjust packet size or change codec of a communication session before recording it, thereby modifying the communication, wherein a conference bridge then transmits the modified communications data to the recorder to record the modified communications data in optimal fashion;
    receiving an event at the recorder from a media distribution device, the event being identified by a capture engine at the media distribution device;
    acting on the event at the recorder to change to a second recording mode to protect data associated with the communication session; and
    resuming the first recording mode after a predetermined timeout period expires, wherein the timeout period is a predetermined value, a specified value in the event, a condition on a business rule, or a value associated with specific agents or extensions.

2. The method of claim 1, wherein the first recording mode and the second recording mode is at least one of: start, stop, resume, pause, skip, insert, encrypt, mark, flag, tag or segment.

3. The method of claim 1, further comprising identifying the data during the communication session, wherein the identifying is performed by at least one of a customer relationship management (CRM) system, interactive voice response (IVR) system, computer telephony integration (CTI) server, an analytics application or a payment application.

4. The method of claim 1, wherein the event instructs the recorder to protect data in the communication session.

5. The method of claim 4, wherein to protect data comprises at least one of inserting silence into the recording, pausing the recording, resume the recording, encrypting the recording to protect the data, and marking the recording and/or metadata for a start of a protected section.

6. The method of claim 1, further comprising receiving a second event at the recorder to resume the first recording mode.

7. The method of claim 1, further comprising:
    applying business rules to the event; and
    changing to the second recording mode in accordance with the business rules.

8. The method of claim 1, wherein the rule is one of one of recording all calls for compliance reasons, selective recording based on attributes associated with the communication session, selective recording based on specific agents, or selective recording based on specific extensions.

9. An apparatus for protecting information provided during a communication session, comprising:
  a recorder that records the communication session in a first recording mode in accordance with a rule, the recorder being operative to receive and act on an event to change to a second recording mode to protect data associated with the communication session, the event being identified by a capture engine at the media distribution device that communicates the event to the recorder, wherein the recorder has a telephony component to adjust packet size or change codec of a communication session before recording it, thereby modifying the communication, wherein a conference bridge then transmits the modified communications data to the recorder to record the modified communications data in optimal fashion,
  wherein the first recording mode is resumed after a predetermined timeout period expires, wherein the timeout period is a predetermined value, a specified value in the event, a condition on a business rule, or a value associated with specific agents or extensions.

10. The apparatus of claim 9, wherein the first recording mode and the second recording mode is at least one of: start, stop, resume, pause, skip, insert, encrypt, mark, flag, tag or segment.

11. The apparatus of claim 9, further comprising a second component that identifies the data during the communication session, wherein the second component is at least one of a customer relationship management (CRM) system, interactive voice response (IVR) system, computer telephony integration (CTI) server, a desktop analytics application or a payment application.

12. The apparatus of claim 9, wherein the event instructs the recorder to protect data in the communication session when the second recording mode.

13. The apparatus of claim 12, wherein to protect data comprises at least one of inserting silence into the recording, pausing the recording, resume the recording, encrypting the recording to protect the data, and marking the recording and/or metadata for a start of a protected section.

14. The apparatus of claim 9, wherein a second event is received by the recorder to resume the first recording mode.

15. The apparatus of claim 9, wherein business rules are applied to the event at the recorder, and wherein the second recording mode is changed to in accordance with the business rules.

16. The apparatus of claim 9, wherein the rule is one of one of recording all calls for compliance reasons, selective recording based on attributes associated with the communication session, selective recording based on specific agents, or selective recording based on specific extensions.

17. A method for protecting information provided during a communication session, said method comprising:
  recording the communication session at a recorder in accordance with a rule, wherein the recorder has a telephony component to adjust packet size or change codec of a communication session before recording it, thereby modifying the communication, wherein a conference bridge then transmits the modified communications data to the recorder to record the modified communications data in optimal fashion;
  receiving an event at the recorder from a media distribution device, the event being identified by a capture engine at the media distribution device;
  pausing the recording at the recorder to protect data associated with the communication session; and
  resuming the recording mode after a predetermined timeout period expires, wherein the timeout period is a predetermined value, a specified value in the event, a condition on a business rule, or a value associated with specific agents or extensions.

18. The method of claim 17, further comprising receiving a second event at the recorder to unpause the recording.

* * * * *